(12) United States Patent
Contreras et al.

(10) Patent No.: US 8,988,829 B1
(45) Date of Patent: Mar. 24, 2015

(54) DISK DRIVE WITH PREAMPLIFIER FOR MULTIPLE READERS IN A SLIDER WITH A COMMON RETURN SIGNAL

(71) Applicant: HGST Netherlands B.V., Amsterdam (NL)

(72) Inventors: John Contreras, Palo Alto, CA (US); Joey Martin Poss, Rochester, MN (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/489,477

(22) Filed: Sep. 18, 2014

Related U.S. Application Data (60) Provisional application No. 61/879,544, filed on Sep. 18, 2013.

(51) Int. Cl.
  *G11B 21/20* (2006.01)
  *G11B 20/10* (2006.01)
  *G11B 5/48* (2006.01)

(52) U.S. Cl.
  CPC .......... *G11B 20/10046* (2013.01); *G11B 5/486* (2013.01)
  USPC .................................... 360/234.5; 360/245.9

(58) Field of Classification Search
  CPC .. G11B 5/4854; G11B 5/6005; G11B 5/4826; G11B 5/486; G11B 5/4833; G11B 27/36; G11B 5/012
  USPC ................. 360/360, 234.5, 245.9, 46, 31, 67, 360/245.8, 234.2, 128; 29/603.03
  See application file for complete search history.

(56) References Cited

U.S. PATENT DOCUMENTS

| | | |
|---|---|---|
| 5,796,552 A | 8/1998 | Akin, Jr. et al. |
| 5,930,072 A | 7/1999 | Shrinkle |
| 6,088,235 A | 7/2000 | Chiao et al. |
| 6,265,905 B1 | 7/2001 | Jove et al. |
| 6,404,579 B1 | 6/2002 | Ranmuthu et al. |
| 6,420,910 B1 | 7/2002 | Contreras et al. |
| 6,631,052 B1 | 10/2003 | Girard et al. |
| 7,525,768 B2 | 4/2009 | Wu et al. |
| 7,600,310 B2 * | 10/2009 | Ho et al. .................... 29/603.03 |
| 7,643,250 B2 | 1/2010 | Araki et al. |
| 7,929,248 B2 | 4/2011 | Zhu et al. |
| 7,952,833 B2 | 5/2011 | Smith |
| 8,094,413 B1 | 1/2012 | Hentges et al. |
| 8,174,793 B2 | 5/2012 | Hasegawa et al. |
| 8,233,240 B2 | 7/2012 | Contreras et al. |
| 8,295,011 B2 | 10/2012 | Chou et al. |
| 2014/0160590 A1 | 6/2014 | Sankaranarayanan et al. |

* cited by examiner

*Primary Examiner* — Nabil Hindi
(74) *Attorney, Agent, or Firm* — G. Marlin Knight (57) ABSTRACT

Disk drive embodiments with common lead connections in the slider, suspension, and preamplifier are described. The arm electronics IC includes a preamplifier with single-ended input from the set of signal traces that include a common signal return lead for the plurality of read transducers (readers) in the slider. Two embodiments of the preamps are described that include a single-ended design and a pseudo-single-ended design. Each embodiment supplies the required bias to each read transducer using an operational transconductance amplifier (OTA) that drives a variable current source connected to the transducer. The positive input to the OTA is a DC voltage with the AC signal from the transducer imposed on it. The negative input is a DC reference voltage. Various embodiments of the signal trace configuration on the suspension are described including a single and double layer embodiments.

16 Claims, 7 Drawing Sheets

DISK DRIVE WITH PREAMPLIFIER FOR MULTIPLE READERS IN A SLIDER WITH A COMMON RETURN SIGNAL

RELATED APPLICATIONS

This application is related to provisional application 61/879,544, which was filed on Sep. 18, 2013 and the benefit of which is hereby claimed for the present application. A related application is titled INTEGRATED LEAD SUSPENSION (ILS) FOR TWO-DIMENSIONAL MAGNETIC RECORDING (TDMR) DISK DRIVE filed Jul. 25, 2014, bearing Ser. No. 14/340,690.

FIELD OF THE INVENTION

The present invention relates to the field of magnetic disk drive design and more particularly to the design and interconnection of sliders, suspensions for sliders and signal amplifiers and more particularly to the design and interconnection of such components in a system having a plurality of read heads (readers) in a slider.

BACKGROUND

Figure 1:
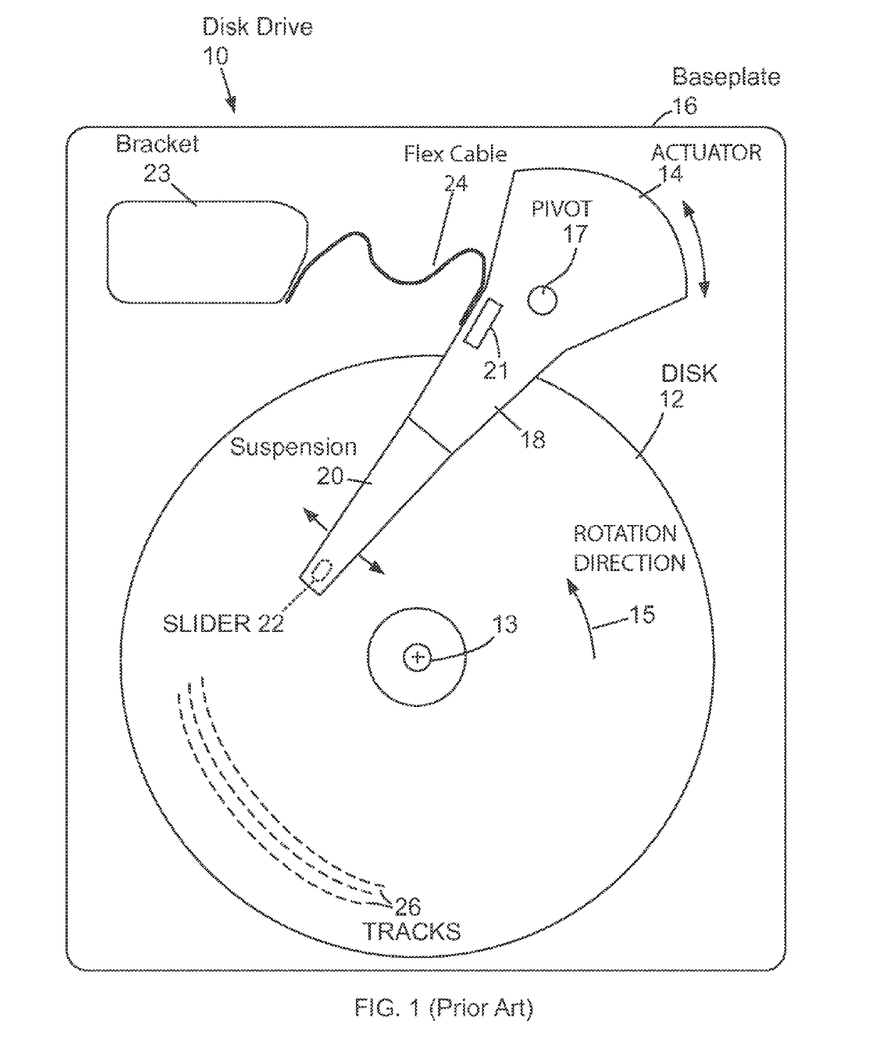
FIG. 1 is an illustration of selected components of a disk drive according to the prior art.

A disk drive system includes at least one magnetic disk, read/write heads, and a suspension which supports a slider with the magnetic read/write heads and provides electrical connections to the system electronics. FIG. 1 is an illustration of selected components of a disk drive 10 according to the prior art. The disk drive includes at least one magnetic recording disk 12 that rotates on spindle 13 in direction 15 driven by a spindle motor (not shown). Housing or baseplate 16 provides support for the components. The upper portion of the outer protective case, which is present for normal operation, is removed for this illustration. The data is recorded in concentric or spiral data tracks 26 that are generally circular. Only a small sample of the many tracks are shown. In practice there are thousands of tracks that extend 360 degrees around the disk. The disk drive includes actuator 14 that pivots on pivot point 17 driven by a rotary voice coil motor (VCM) (not shown). The actuator 14 includes a rigid actuator arm 18. A flexible wiring cable 24, which is usually called the "flex cable," connects the devices on the actuator including read and write heads (not shown) in the slider 22 and the read/write integrated circuit chip (R/W IC) 21 shown) to the drive's system electronics (not shown). The arm electronics chip 21, which is also is interchangeably called the R/W IC or preamplifier chip, is typically mounted on the actuator arm as shown or integrated into the flex cable. A suspension 20, which is attached to the end of arm 18, includes a flexure/gimbal element (not shown) on which the air-bearing slider 22 is mounted to allow flexible movement during operation. As the disk 12 rotates, the slider with read/write heads is selectively positioned over a track to read and write the magnetic transitions. Disk drives often have more than one disk mounted on the spindle and the upper and lower surfaces of each disk can have magnetic recording material thereon, and the actuators with components mounted thereon are replicated as needed to access each of the recording surfaces.

The flex cable 24 provides electrical connections between the actuators and the system electronics on a circuit board (not shown). The flex cable 24 is rigidly attached by stationary bracket 23 at one end, which connects to the system electronics. The other end of the flex cable is attached to the set of actuators 14 which move in unison in response to the VCM.

Figure 2A:
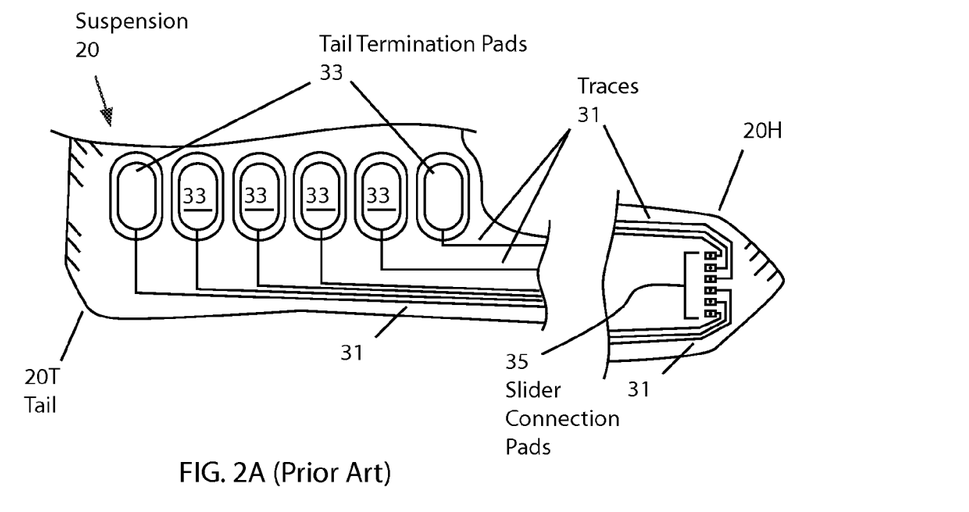
FIG. 2A is an illustration of a top view of selected components of a prior art suspension with electrically conductive traces.

A plurality of electrical paths (not shown) extend from the flex cable along the actuators to the arm electronics chip 21. The arm electronics chip is in turn connected by a plurality of electrical paths that extend through the suspension 20 and connect to the slider 22 as further illustrated in FIG. 2A. These electrical paths are typically called traces 31 and are made of copper. The load beam structure of the suspension is a spring metal layer, which is typically stainless steel. The tail end of the suspension has a set of tail termination pads 33 for electrical connection to the corresponding traces 31. The traces carry the signals for the readers (read heads), writer (write head) in the slider, as well as any additional signals required for fly height control, heater, etc. The example suspension in FIG. 2A has six termination pads that provide connection to six slider connection pads 35 that are in turn connected to the slider (not shown) at the slider (or head) end 20H of the suspension. Higher numbers of pads and corresponding traces are common. The traces can vary in width and additional structures/features can be included in the paths to control electrical parameters such as impedance. Dielectric material separates the traces from the spring metal layer and a covering layer dielectric material is typically deposited over the traces. Subtractive and/or additive photolithography, deposition and etching processes can be used to manufacture suspensions and form the traces.

Typically the stainless steel spring metal layer in the suspension has been used as a ground plane for the traces. Because of the spatial constraints imposed on the suspension a multi-layer or stacked trace configurations have been used. Klaassen et al. in U.S. Pat. No. 6,608,736 disclose stacked read line traces arranged on top of each other and separated from each other by a dielectric layer and separated from the stainless steel base layer by another dielectric layer.

U.S. Pat. No. 8,094,413 to Hentges, et al. (Jan. 10, 2012) describes a disk drive head/slider suspension flexure with stacked traces having differing configurations on the gimbal and beam regions. A head suspension is described that includes integrated lead suspension flexure having stacked traces that run along one side of the spring metal layer and multi-layer traces that run along the other side. The traces come together in the tail region of the suspension where the set termination pads provide electrical connection to the system. The head suspension component includes stacked traces having first and second traces in the first and second conductor layers, respectively. The stacked traces are used for the writer in an embodiment and the multilayer traces are used for the reader and fly height traces and include a ground layer.

U.S. Pat. No. 8,233,240 to Contreras, et al. Jul. 31, 2012 describes an integrated lead suspension (ILS) in a magnetic recording disk drive has the transmission line portion of the ILS between the flex cable termination pads at the tail and the gimbal area formed of multiple interconnected segments, each with its own characteristic impedance. At the interface between any two segments there is a change in the widths and in impedance of the electrically conductive traces of the transmission line. The number of segments and their characteristic impedance values are selected to produce the largest frequency bandwidth with a substantially flat group delay from the write driver to the write head.

Figure 2B:
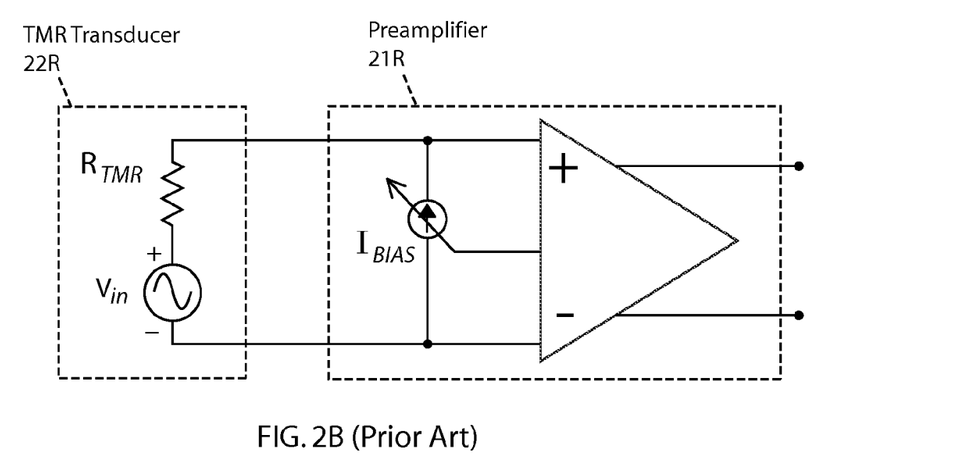
FIG. 2B is a block illustration connections between a read transducer and a preamplifier according to the prior art.

FIG. 2B illustrates a reader MR transducer, such as a tunneling magnetoresistive (TMR) transducer 22R, that is included in a slider and the preamplifier 21R that is included in arm electronics chip 21. The electrical signals pass through the traces in the suspension described above. The MR transducer is typically supplied with a current bias as illustrated, which allow changes in the resistance to be reflected in the signal. The current I-bias varies in a low frequency range under the control of the preamplifier. The signal can be amplified by current-sensing or voltage-sensing amplifier with a single-ended or differential input signal. The bias generator and the amplifier are typically combined and referred to as the preamp and included in the integrated circuit. The processed amplified signal is then sent to the system electronics through the flex cable as a differential signal.

Figure 3:
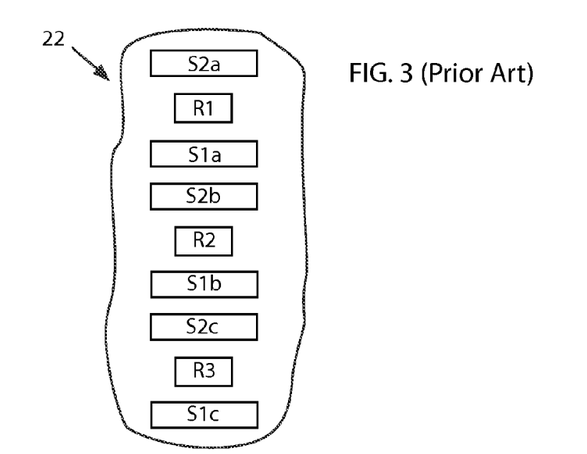
FIG. 3 is an illustration of a section view of selected components of a prior art slider with multiple read heads.

As areal densities continue to increase, recording schemes using more than one read head in each slider are being explored since having multiple readers allows higher density recording. FIG. 3 is an illustration of a section view (looking at the air-bearing surface) of selected components of a prior art slider 22 with three read transducers/heads R1 . . . R3. Higher numbers of transducers are possible. As shown each read transducer is flanked by a pair of shields, e.g. R1 has shields S1a, S2a; R2 has shields S1b, S2b; and R3 has shields, S1c-S2c. There is significant physical separation between the transducers, which leads to skew in relation to the tracks on the disk.

For Multiple Input Multiple Output (MIMO), also called Two Dimensional Magnetic Recording (TDMR), there are two or more TMR read transducers. Problem areas in front-end system design for multiple-reader architectures include: 1) slider design; 2) suspension interconnection, and 3) multiple reader preamplifier design. Each TMR transducer normally requires two electrical paths (traces or wires) from the slider to the preamplifier. There is limited room for these electrical paths between the slider and the preamplifier. Each trace path has a cost associated with it.

For the present disclosure, a three-reader (3R) architecture configuration and an independent differential amplifier (IDA) is assumed as the current state of the art. A 3R slider design using IDAs requires six connection pads (R1, −R1, R2, −R2, R3, & −R3) on the surface of the slider, which will consume much of the available external area on the slider.

In addition, having three separate independent readers requires additional space between read transducers inside the slider. Having additional distance between read transducers creates skew problems caused by physical distance between the transducers. The fly-height control between transducers also creates spacing control problems due to the additional distance between transducers. For the suspension interconnection, having six conductive traces creates area issues in the layout, where the suspension's tail width space is limited. For the preamplifier, having IDAs requires additional IC area and power, which are key design constraints for the electronic packaging (flex area and mechanical connection to actuator).

For the above three segments of the front-end system, a design solution is needed to minimize the overall required area and power requirement.

SUMMARY OF THE INVENTION

Disk drive embodiments of the invention with common lead connections in the slider, suspension, and preamplifier creates the common lead system, which allows for a substantial reduction in layout area for the interconnects in the slider, for the suspension, and in the arm electronics IC. The arm electronics IC includes a preamplifier with input from the set of signal traces that include a common signal return lead for the plurality of read transducers (readers) in the slider. In embodiments with three readers, for example, four signal traces (wires) are used to connect the set of readers in the slider to the preamps. Two embodiments of the preamps are described that include a single-ended (SE) design and a pseudo-single-ended (PSE) design. Each embodiment supplies the required bias to each read transducer using an operational transconductance amplifier (OTA) that drives a variable current source connected to the transducer. The positive input to the OTA is a DC voltage with the AC signal from the transducer imposed on it. The negative input is a DC reference voltage, which floats with respect to signal ground in the PSE preamp and is generated with respect to signal ground in the SE preamp.

Various embodiments of the signal trace configuration on the suspension are described. In a single-layer embodiment, the common return lead is split into two traces on the suspension which are interleaved with the three dedicated signal traces. In a dual-layer embodiment, the three dedicated signal traces are placed in one layer and common return lead is placed in a second layer. In one embodiment a shielding network of traces acts like a shield in a coaxial cable.

DETAILED DESCRIPTION OF THE EMBODIMENTS OF THE INVENTION

The common lead connections of the slider, suspension, and preamplifier creates the common lead system, which allows for a substantial reduction in layout area for the interconnects in the slider, for the suspension, and in the arm IC. Utilizing a common-lead connection according to embodiments of the invention for the plurality of readers creates compact electrical connections between the amplifier and the readers. The suspension can then have a reduced or minimum number of signal traces. Therefore, a common-lead architecture readers (CLAR) system enables a compact system design of the TMR transducers, suspension, and amplifier. The CLAR solution reduces the electrical traces/wiring for the three segments of the front-end system: 1) heads and slider, 2) suspension, and 3) a multiple reader preamplifier. The CLAR system reduces the I/O count which helps reduce the layout area for a more compact design of all three front-end segments. A common-lead (CL) connection is used for the slider, which enables a compact design of the readers. In addition, this architecture allows for lower power consumption using single-ended preamplifier circuit designs with a single supply voltage.

Figure 10:
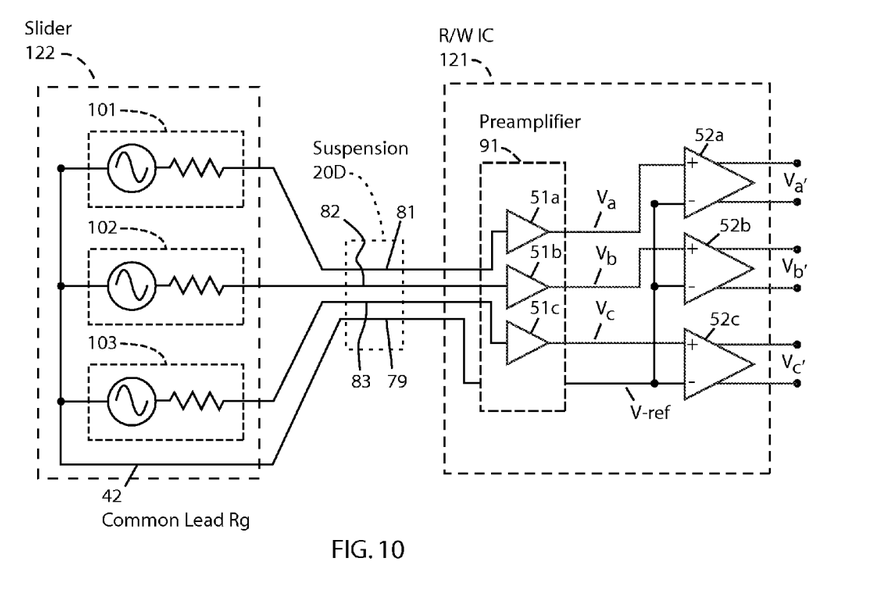
FIG. 10 is a block diagram illustrating the interconnections between a slider with three readers, a suspension and a preamplifier amplifier using a common lead according to an embodiment of the invention.

FIG. 10 is a block diagram illustrating an overview of the interconnections between a slider 122 with three readers (e.g. TMR transducers), a suspension 20D and a R/W IC 121 with preamplifier 91 using a common lead according to an embodiment of the invention. Although the embodiments described herein are for three reader systems, the concepts apply to systems with two or more readers with straightforward modifications. The slider 122 includes three readers 101, 102, 103 that share common lead 42 inside the slider. The signals for the three readers are transmitted through suspension 20D on electrically conductive traces 81-83 and common lead trace 79. The signals are connected to preamplifier 91, which is a component inside R/W (arm electronics) IC 121. The three signals are processed through common lead amplifiers 51a-c to generate corresponding output signals $V_a$, $V_b$, $V_c$ which are differential signals referenced to the V-ref signal. The output signals $V_a$, $V_b$, $V_c$ are then further processed by differential amplifiers 52a-c, which each have V-ref as the negative input, to generate output signals $V_a'$, $V_b'$, $V_c'$, which are then transmitted to the system electronics (not shown) in the disk drive for further processing according to prior art techniques. As noted above the preamplifier 91 also supplies bias current to each of the readers although this function is not illustrated in FIG. 10. The internals of embodiments of the preamplifier will be discussed further below.

Figure 4:
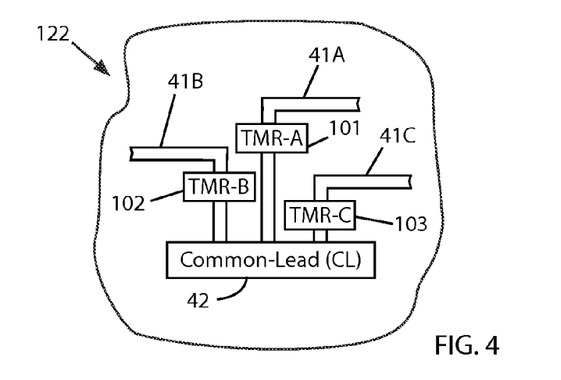
FIG. 4 is an illustration of the electrical connections in a slider according to an embodiment of the invention with three read heads as viewed from the air-bearing surface.

FIG. 4 is an illustration of the electrical connections in a slider according to an embodiment of the invention with three TMR readers 101, 102, 103 as viewed from the air-bearing surface (ABS). In contrast to the arrangement shown in FIG. 3, the common lead design allows a compact arrangement of the readers in relation to the ABS and, therefore, the tracks on the disk. The common lead 42 also serves a shield for the readers. An additional shield (not shown) would be positioned above TMR 101 as shown on the page. The reader signals inside the slider are carried on the three conductive paths 41A, 41B, 41C, which along with common lead 42 are connected to pads on the exterior of slider 122, which are then connected to the traces in the suspension.

Figure 5:
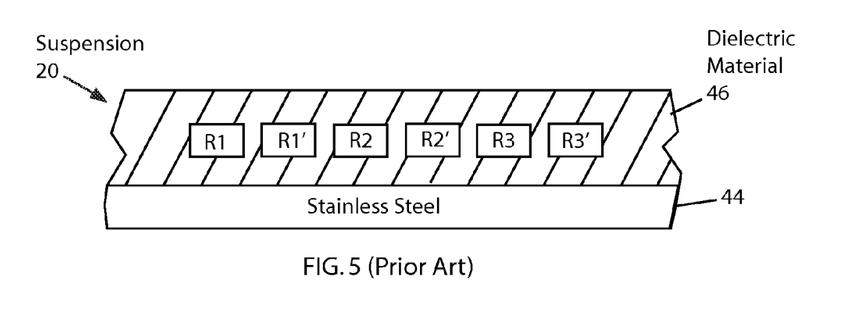
FIG. 5 is an illustration of a section view of selected components of a prior art suspension with traces for multiple read heads.

FIG. 5 is an illustration of a section view of selected components of a prior art suspension 20 with traces for three read heads (readers). For each reader there are two traces, e.g. R1 and R1', R2 and R2', R3 and R3'. Therefore, six traces are needed for the three readers. The stainless steel layer 44 is separated from the conductive material (typically copper) that forms the traces by dielectric material (not shown).

For a three reader (3R) system, the minimum total number of connection pads is 4 (R1, R2, R3, & Rg), where Rg is the CL connection. For the suspension interconnection, using a CL design allows for a reduction of leads in a 3R system, from 6 to 4 leads. This suspension interconnect can be a dual layer configuration or a coplanar configuration with interstitial return lines, which then allows for the reduction of lines from 6 to 5 lines. With both the dual-layer and coplanar suspension interconnect, the CL connection allows for a reduction of I/Os and area savings in the layout.

Figure 6A:
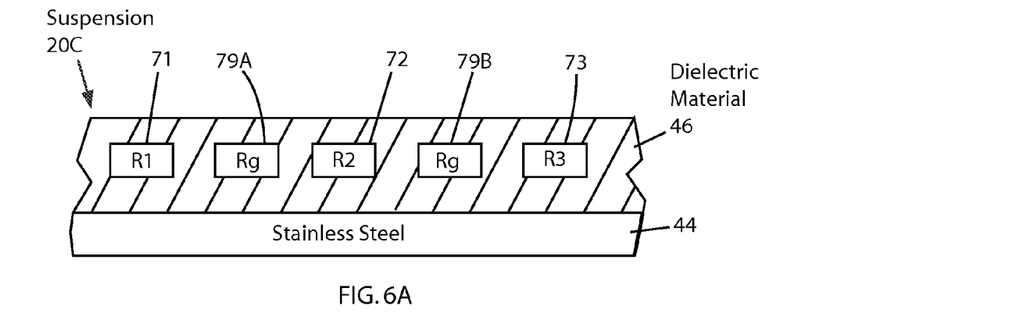
FIG. 6A is an illustration of a section view of selected components of a suspension according to an embodiment of the invention with single layer traces for multiple read heads and a common lead according to an embodiment of the invention.

FIG. 6A is an illustration of a section view of selected components of a suspension 20C according to an embodiment of the invention with a single layer of traces for multiple read heads and a common lead according to an embodiment of the invention. The view is at a point in the suspension between slider connection pads and the tail termination pads. This embodiment uses a coplanar configuration with interstitial return lines 79A, 79B, which then allows for the reduction of trace lines from 6 to 5 lines. The conductive material in the traces is separated by dielectric material 46, which also separates the traces from the stainless steel layer 44. In this embodiment each reader has a dedicated single trace. Accordingly the dedicated trace for the first reader is R1 71, for the second reader R2 72 and for the third reader R3 73. In this embodiment the shared common lead traces Rg are 79A, 79B. These two Rg traces are electrically connected/shorted at both ends of suspension, i.e. in the head and tail areas. The two Rg traces help create a noise resistant transmission line.

Figure 6B:
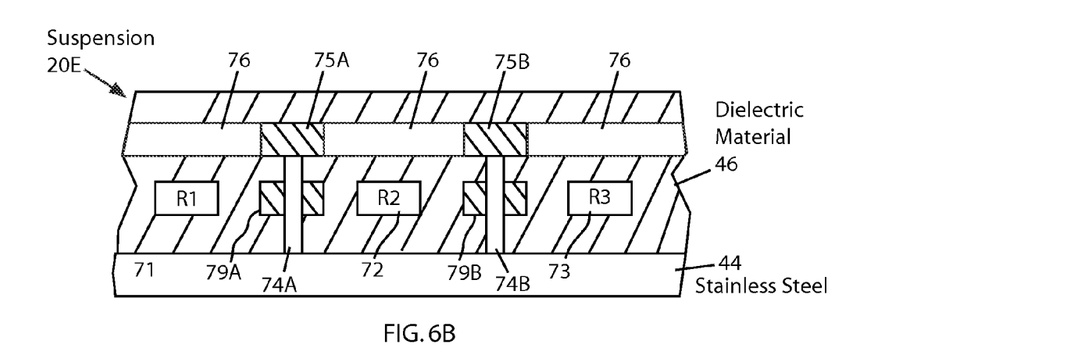
FIG. 6B is an illustration of a section view of selected components of a suspension according to an embodiment of the invention with dual layer traces with vias filled with conductive material connecting an upper network of traces with the common for multiple read heads according to an embodiment of the invention.
Figure 6C:
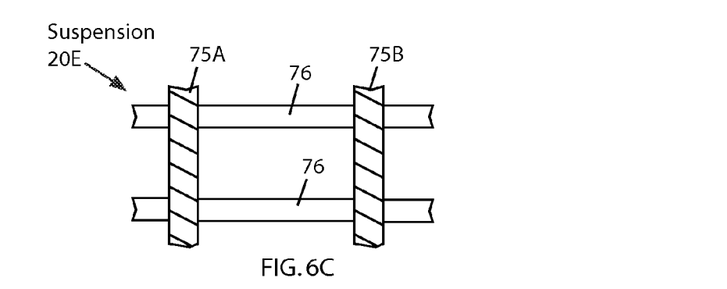
FIG. 6C is an illustration of a top view of selected components forming the shielding net in a suspension shown in FIG. 6B.

FIG. 6B is an illustration of a section view of selected components of a suspension 20E according to an embodiment of the invention with dual layer traces with vias 74A, 74B filled with conductive material connecting an upper network of traces 75A, 75B, 76 with the common for multiple read heads according to an embodiment of the invention. The first layer of traces in this embodiment is similar to the one shown in FIG. 6A, but an additional upper layer of conductive traces is formed that includes 75A, 75B which extend into and out of the page as shown in parallel with the traces 79A, 79B, 71-73 in the first layer. FIG. 6C is an illustration of a top view of selected components forming the shielding network of traces in a suspension shown in FIG. 6B. The network is formed by periodically having connecting traces 76 that extend perpendicularly across the suspension. The connecting traces 76 and traces 75A, 75B form a net of conducting material electrically connected to the common return signal and the stainless steel, which together act like the outer conductive shield of a coaxial cable to provide shielding for the signal carrying traces.

Figure 7:
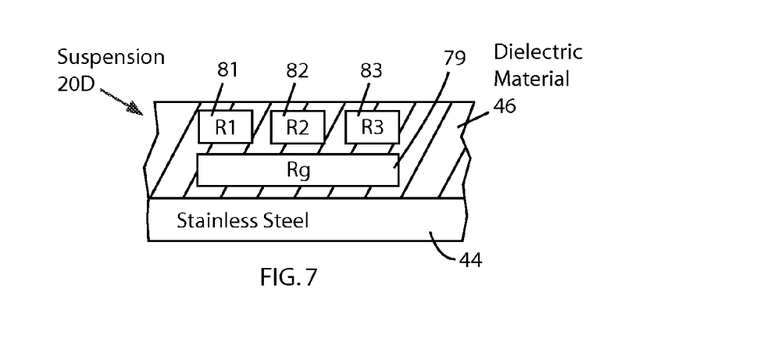
FIG. 7 is an illustration of a section view of selected components of a suspension according to an embodiment of the invention with dual layer traces for multiple read heads and a common lead according to an embodiment of the invention.

FIG. 7 is an illustration of a section view of selected components of a suspension 20D according to an embodiment of the invention with dual layer traces for three read heads and a single common lead Rg 79 according to an embodiment of the invention. The view is at a point in the suspension between slider connection pads and the tail termination pads. In this embodiment the CL design allows for a reduction of leads in a 3R system, from 6 to 4 leads. The three dedicated conductive traces 81-83 for readers R1, R2 and R3 are shown in a first layer of the suspension and the trace for the common lead Rg 79 is formed in a second layer. The conductive material in the first and second layers is separated by dielectric material 46. The common lead Rg 79 is also separated from the stainless steel layer 44 by dielectric material 46.

Figure 8:
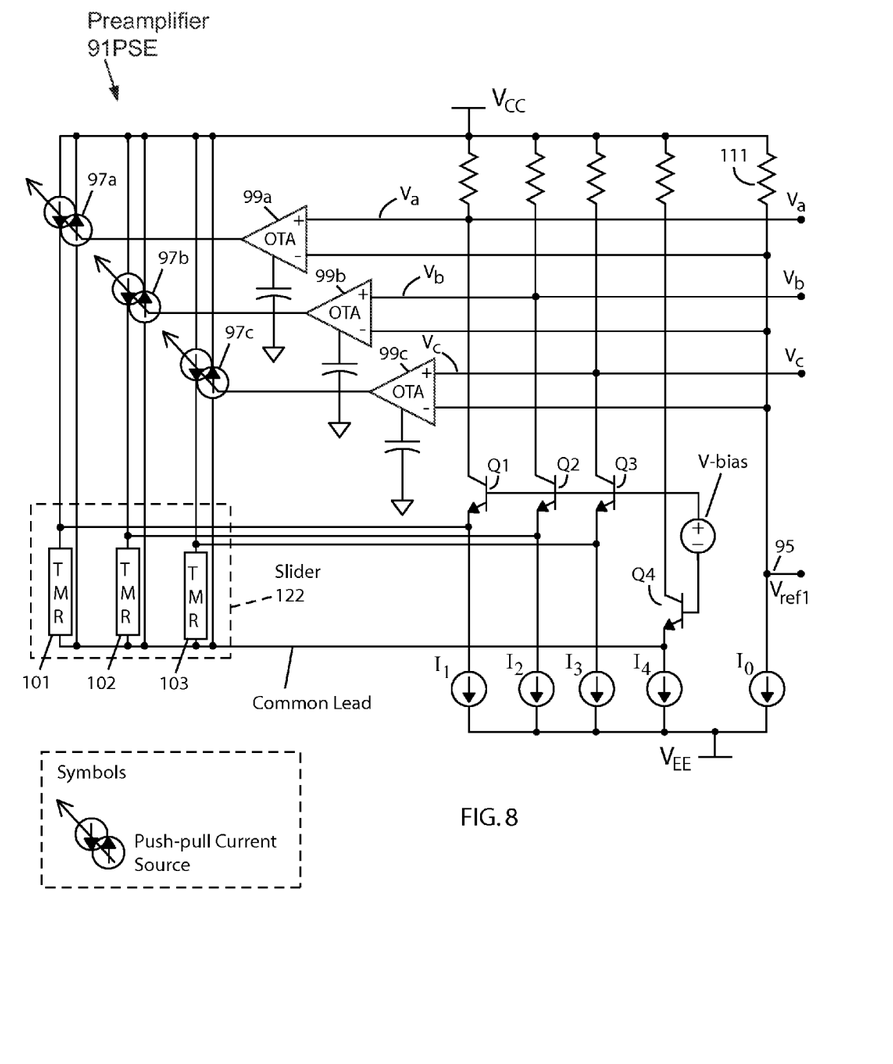
FIG. 8 is a circuit diagram illustrating a pseudo single-ended (PSE) amplifier circuit design for a three reader system with a common lead according to an embodiment of the invention.
Figure 9:
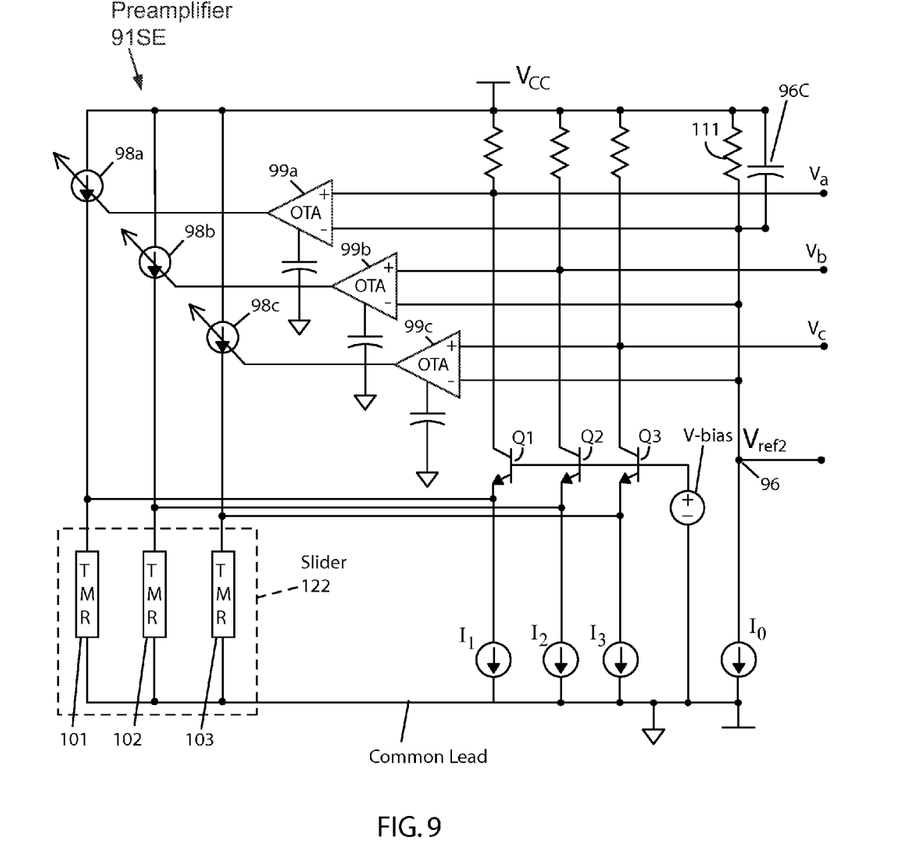
FIG. 9 is a circuit diagram illustrating a single-ended (SE) amplifier circuit design for a three reader system with a common lead according to an embodiment of the invention.

Single-ended (SE) or pseudo single-ended (PSE) amplifier designs can be used in a system with the CL connection to achieve compact connection between the R/W IC and the plurality of readers. FIG. 8 is a circuit diagram illustrating a pseudo single-ended (PSE) preamplifier circuit design 91PSE for a three reader system with a common lead according to an embodiment of the invention. The design can be extended to include additional readers. The PSE embodiment requires dual power supply voltages ($V_{CC}$, $V_{EE}$). FIG. 9 is a circuit diagram illustrating a single-ended (SE) preamplifier circuit design 91SE for a three reader system with a common lead according to an embodiment of the invention. The SE embodiment only requires a single power supply voltage referenced to the common lead as shown. Each of the embodiments use three operational transconductance amplifiers (OTAs) 99*a-c* to drive variable current sources that are connected to the corresponding readers, which are TMR transducers 101, 102, 103. In each embodiment the corresponding intermediate output signals are $V_a$, $V_b$, $V_c$ which are also the positive inputs to the corresponding OTAs. The negative input signal to the OTAs is a reference voltage (V-ref1 95 in the PSE embodiment and V-ref2 96 in the SE embodiment), which is generated by a current source $I_0$ and a resistor 111. In the PSE embodiment the current source is connected to the negative power supply voltage $V_{EE}$, and, therefore, V-ref1 95 floats with respect to common lead level.

In contrast in the SE embodiment the current source $I_0$ is connected to the common lead, which is also the power supply return and, therefore, V-ref2 96 is directly referenced to common lead level. In the SE embodiment the common lead is the signal ground, so the signal return symbol in FIG. 9 indicates a connection to the common lead. The capacitor 96C is connected between the V-ref2 and Vcc. The value of capacitance for capacitor 96C is selected to determine the lowest frequency response of the preamplifier. The capacitor 96C shunts noise created by resistor 111, which allows the differential amplifiers to respond to these signals without the added noise from resistor 111.

The transistors Q1, Q2, Q3 are effectively DC current sources that pull current through their corresponding resistors connected to their collectors, which are connected to the corresponding positive input leads to the OTAs. The variable signal from the TMR transducers is a midband AC signal, for which the transistors Q1, Q2, Q3 act as a short circuit. Therefore, the AC signal from a transducer passes from the emitter lead through the corresponding transistor and is applied to the positive input of the corresponding OTA. The OTAs generate a signal that drives the variable current sources that supply the bias current to the transducers. The negative input of each OTA is a reference voltage, therefore, the OTAs act to control the bias current through the transducers so that the difference between the positive and negative inputs tends toward zero in the operational frequency band of the OTAs.

In the PSE embodiment the variable current sources are paired push-pull sources in which one source supplies the transducer and the other source provides a balancing return path for the current from the emitter of Q4, which is connected to current source $I_4$. The base lead of Q4 is connected to the negative side of the floating voltage bias source V-bias. The positive side of V-bias is connected to each of the base leads of Q1-Q3. The emitters of Q1-Q3 are connected to corresponding current sources $I_1$-$I_3$. These current sources have a high impedance with respect to the transducer signal frequency and therefore, are effectively open circuits with respect to the transducer signal. The intermediate output signals $V_a$, $V_b$, $V_c$ are further processed by subtracting the V-ref signal 95, i.e. the final output signal for each transducer is the difference between its intermediate output signal ($V_a$, $V_b$, or $V_c$) and the V-ref signal 95. Differential amplifiers in the next stage as shown in FIG. 10 can be used for this process.

There are fewer active components in the SE embodiment than in the PSE embodiment. The variable current sources 97*a-c* in the PSE embodiment are push-pull current sources. The variable current sources 98*a-c* in the SE embodiment of FIG. 9 are push current sources that are only connected to the corresponding transducers. The SE embodiment also does not include Q4 and current source $I_4$ and does not need to have the balancing current return path that is required in the PSE embodiment. The negative side of the V-bias voltage reference is connected to the voltage supply return line (which is also the common lead) in the SE embodiment. Thus, in the SE embodiment common lead is directly used a signal ground reference, but in PSE embodiment the common lead is connected to the pull side of the variable current sources and between the emitter of Q4 and the current source $I_4$. Therefore, the V-ref1 95 provides a floating reference level because it is not directly referenced to the common lead. But V-ref2 96 is directly referenced to the common lead level, which is connected to the current source $I_0$ that generates V-ref2 by pulling current through resistor 111.

The PSE embodiment in FIG. 8 uses slightly more power than the SE embodiment, but both embodiments use less power than a comparable prior art differential amplifier configuration for multiple readers. The PSE embodiment has a delta noise that is about 1 dB in comparison to 0 dB for the SE embodiment due to the additional noise sources from the adjacent transistors. The SE embodiment has fewer components than the PSE embodiment and only utilizes one power supply, where PSE requires two power supplies. But both embodiments have fewer components than a prior art implementation using independent differential amplifiers. Therefore, while either the PSE or SE embodiments give improved performance over the prior art, the SE embodiment is preferred. Multiple readers with independent amplifiers would have a significant impact in IC area and power, but amplifier embodiments with a CL connection require less IC area and power.

The invention claimed is:

1. A disk drive comprising:
   a slider with a plurality of read transducers that are each connected to a common return signal lead;
   a suspension with a set of signal traces that include a first trace connected to the common return signal lead in the slider and a selected signal trace connected respectively to each of the plurality of read transducers; and
   a preamplifier connected to the set of signal traces on the suspension, the preamplifier having an input from each of the read transducers and being connected to the first trace as the common return signal lead, the preamplifier supplying a bias current for each read transducer through the selected signal trace connected to each read transducer.

2. The disk drive of claim 1 wherein the preamplifier further comprises a plurality of operational transconductance amplifiers (OTAs) with each OTA driving a variable current source that supplies the bias current for one of the read transducers.

3. The disk drive of claim 2 wherein each operational transconductance amplifier (OTA) has a DC reference voltage as a negative input and a positive input of DC voltage with an AC signal from one of the read transducers.

4. The disk drive of claim 2 wherein each wherein each operational transconductance amplifier (OTA) has a DC reference voltage as a negative input and a positive input signal that includes a DC voltage generated by a current flowing through a resistor and a transistor configured as a current source with an emitter of the transistor being connected to one of the read transducers; and wherein an AC signal from the read transducer passes through the transistor and is applied to the positive input signal of the OTA.

5. The disk drive of claim 4 wherein the transistor's base lead is connected to a positive output of a voltage bias source.

6. The disk drive of claim 1 wherein the set of signal traces on the suspension are arranged in a first layer with at least two selected traces being connected to the common return signal lead.

7. The disk drive of claim 1 wherein the two selected traces connected to the common return signal lead are arranged with one of the selected signal traces connected to the read transducers extending between the two selected traces.

8. The disk drive of claim 1 wherein the slider include at least three read transducers and the set of signal traces on the suspension includes first, second and third signal traces, and wherein the first, second and third signal traces are arranged in a first layer and the trace connected to the common return signal lead is positioned in a second layer under the first layer and wherein the trace connected to the common return signal lead is at least as wide as the first, second and third signal traces combined.

9. The disk drive of claim 1 wherein the slider include at least three read transducers and the set of signal traces on the suspension includes first, second and third signal traces, and wherein the first, second and third signal traces are arranged in a first layer and wherein first and second common lead traces connected to the common return signal lead are positioned in the first layer and wherein the first common lead trace is positioned between the first and second signal traces and the second common lead trace is positioned between the second and third signal traces.

10. The disk drive of claim 9 wherein the suspension includes a shielding network of conductive material in a second layer disposed above the first layer containing the first, second and third signal traces, and wherein the shielding network of conductive material in the second layer is connected to the first and second common lead traces through vias that are filled with electrically conductive material and extend through dielectric material separating the first and second layers.

11. The disk drive of claim 1 wherein the preamplifier has a single supply voltage and a voltage supply return line that is directly connected to the common return signal lead.

12. The disk drive of claim 1 wherein the preamplifier includes a plurality of differential amplifiers that each have an input signal from a selected read transducer and an input of a reference voltage.

13. The disk drive of claim 12 wherein the reference voltage is generated with respect to the common return signal lead.

14. The disk drive of claim 12 wherein the reference voltage is generated with respect to a supply voltage and floats with respect to the common return signal lead.

15. The disk drive of claim 1 wherein the preamplifier is a single-ended design in which a reference voltage that is used as a differential signal for subtraction from signals from the read transducers and the reference voltage is generated with respect to the common return signal lead.

16. The disk drive of claim 1 wherein the preamplifier is a pseudo-single-ended design in which a reference voltage that is used as a differential signal for subtraction from signals from the read transducers and the reference voltage floats with respect to the common return signal lead.

\* \* \* \* \*